April 11, 1933.  D. T. USHER  1,903,647
FRUIT AND VEGETABLE CONTAINER
Filed Oct. 31, 1929    3 Sheets-Sheet 2

INVENTOR.
David T Usher
BY
ATTORNEY.

April 11, 1933. D. T. USHER 1,903,647
FRUIT AND VEGETABLE CONTAINER
Filed Oct. 31, 1929  3 Sheets-Sheet 3
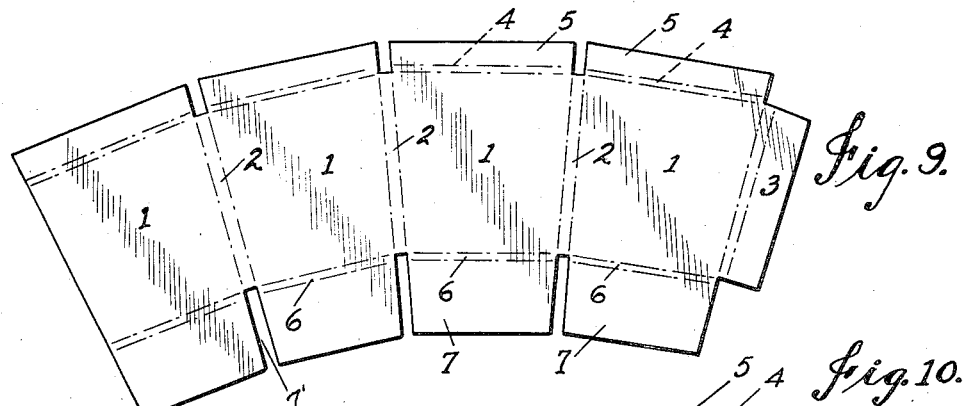
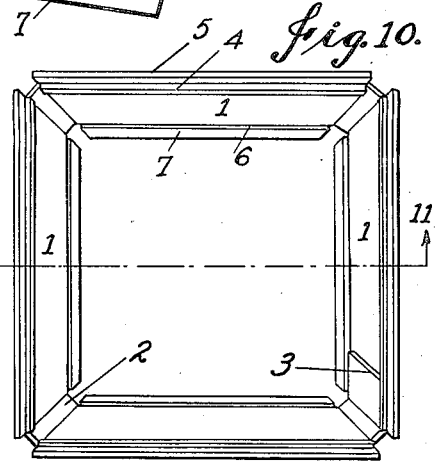
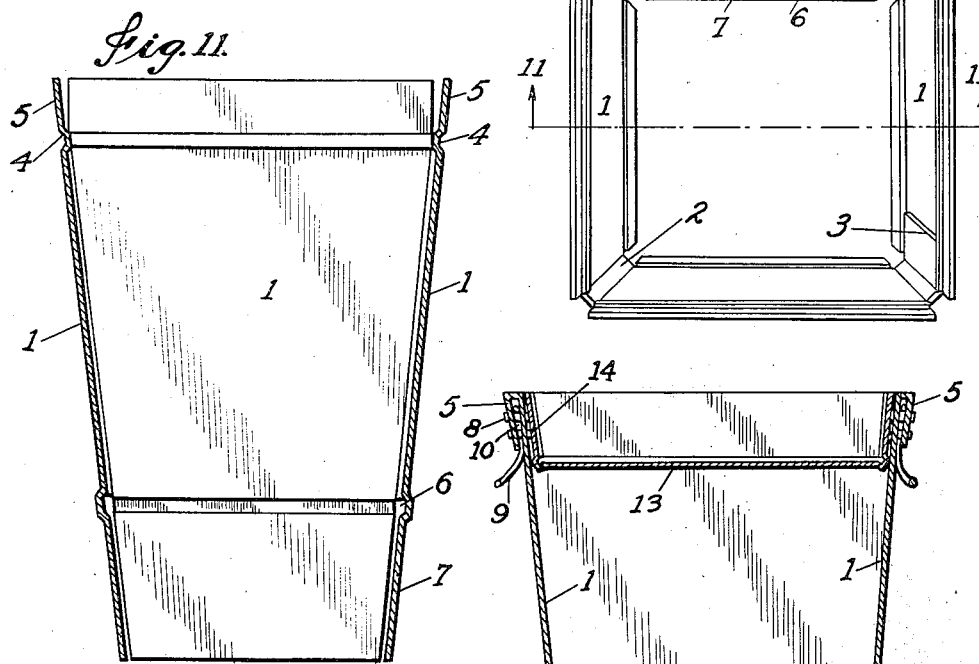
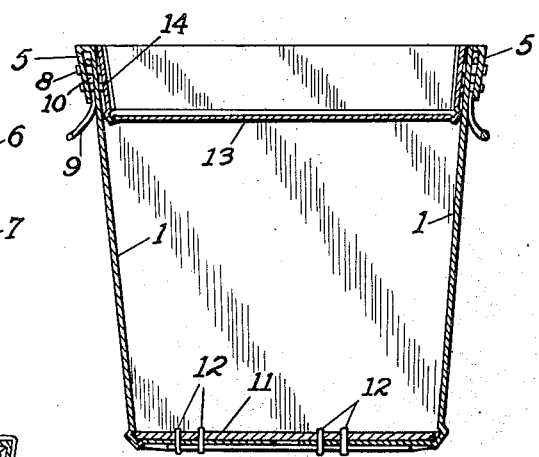
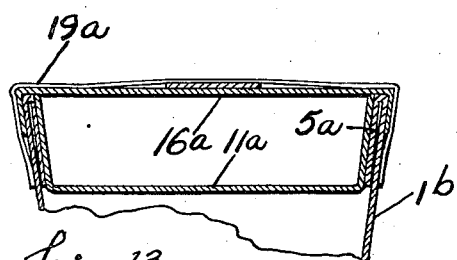
INVENTOR.
David T Usher
BY
Allen Allen
ATTORNEY.

Patented Apr. 11, 1933                                                            1,903,647

UNITED STATES PATENT OFFICE

DAVID T. USHER, OF MOUNT AIRY, NORTH CAROLINA; GERALDINE B. USHER ADMINISTRATRIX OF SAID DAVID T. USHER, DECEASED

FRUIT AND VEGETABLE CONTAINER

Application filed October 31, 1929. Serial No. 403,864.

My invention relates to shipping containers for vegetables and fruit, and particularly to such containers as may be made from blanks of fibrous material such as paper, cardboard, fiber or the like.

In the art there has been considerable development in different types of fibre and paper board containers for different articles of merchandise, but with few exceptions, fruit and vegetables are still packed and shipped in the old fashioned baskets and barrels. Barrels are extremely undesirable for shipping such merchandise, because the fruit or vegetables at the bottom of the package are bruised by the weight of the fruit or vegetables above, nails cut gashes in the fruit or vegetables, the ventilation is poor, and decomposition tends to develop. There are many other reasons why the package is unsatisfactory. Baskets are equally objectionable. They cannot be advantageously stacked, and the fruit or vegetables are crushed and bruised by the weight above. The baskets, due to their shape, cannot be packed so as to economize space in the car or warehouse. Further, when empty, they require almost as much space as when they are full, and in packing the packers have to get supplies such as liners, caps, etc., from different storage places. Baskets further cannot be conveniently opened for display, and when once open, the display fruit or vegetables are usually used up first.

It is the object of my invention to provide a container for fruit or vegetables which will be economical to set up, which will provide a strong and durable package, when packed, so that it will stand the many blows and strains incident to shipping, and which can be economically packed. It is further my object to provide a container which can be economically packed with reference to the space occupied, and which lends itself to staggered row packing which causes the various stresses and strains on the container to be borne in the strongest parts. Another object is the provision of a container in which display vegetables and fruit may be economically packed and shown to advantage, and in which, preferably, the display is carried in a separate container which acts as a lid in reinforcing the container, and which may be removed so that the display may be saved until the container is substantially empty.

The above and other objects to which reference will be made in the ensuing disclosure, I accomplish by that certain combination and arrangement of parts of which I have shown several preferred modifications illustrative of my invention.

In the drawings:

Figure 9 is a plan view of the blank from which the container shown in Figures 1, 6 and 7 may be formed.

Figure 10 is a perspective view from above looking into a set-up container prior to the attachment of the lid.

Figure 11 is a sectional view taken along the lines 11—11 of Figure 10.

Figure 12 is a sectional view taken along the lines 12—12 of Figure 6.

Figure 13 is a fragmentary sectional view of a modified type of container.

Figure 1:
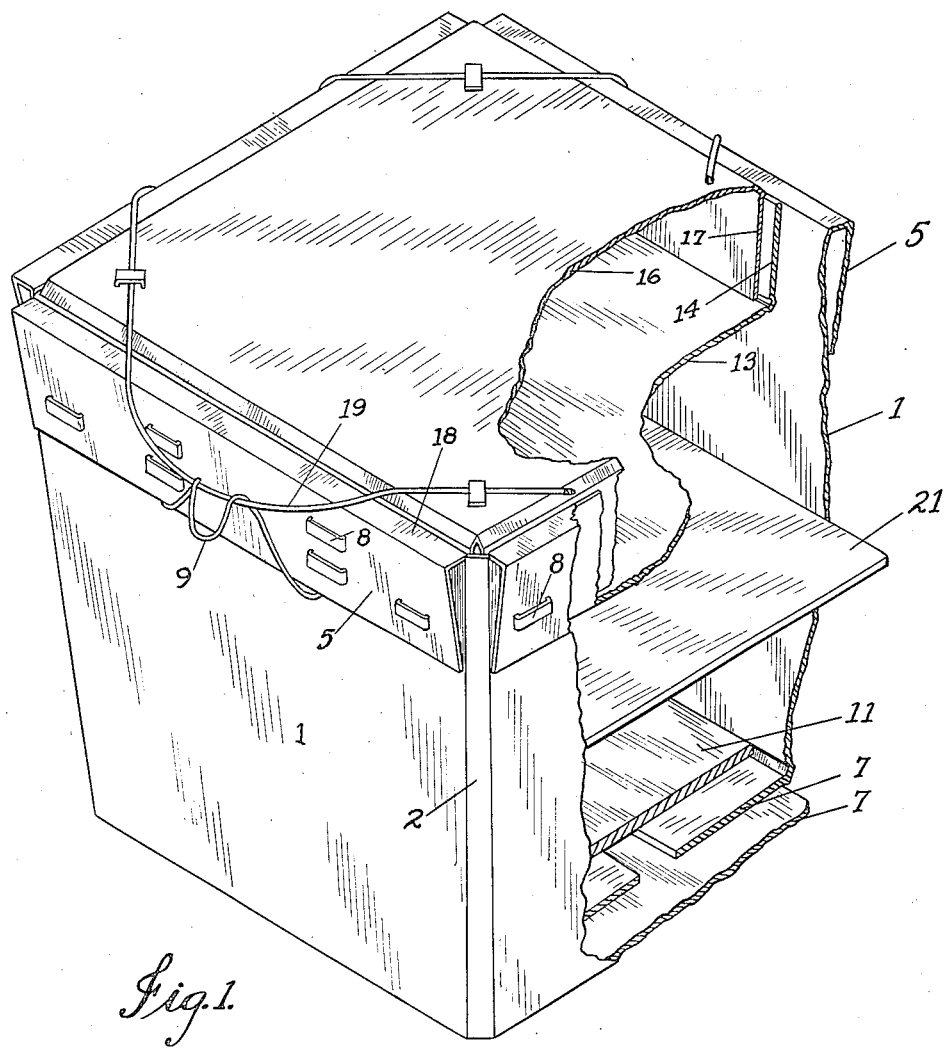
Figure 1 is a perspective view of a container made in accordance with my invention, with parts broken away and shown in section.

Referring first to the blank shown in Figure 9, I provide a flat blank of suitable material, such as fiber or asphaltic-treated board, having side wall portions 1 with lines of articulation formed by scored areas indicated at 2. An attachment flap 3 is also shown, which, when the container is folded into tubular shape, can be stitched or otherwise suitably attached to form a four-wall enclosure tapering from the bottom to the top in the form of an inverted truncated pyramid. Scored areas indicated at 4 provide lines of articulation for reinforcing flaps 5 which are folded over to form reinforced upper edges for the container. The bottom of the container shown in all the illustrations excepting Figure 8, has scored areas indicated at 6 which provide lines of articulation between the side walls of the container and the bottom closure flaps 7 separated by slots 7' which provide the necessary clearance for the closure and reinforcing flaps. When first folded into tubular form, the container has the appearance shown in Figures 11 and 12, with the reinforcing flaps 5 and the closing flaps 6 extending in alignment with the side walls 1a.

The first folding operation consists in folding over the reinforcing flaps 5, and these flaps are then stitched as indicated at 8 to retain them in position. Preferably, at this time handle straps, such as are indicated at 9, which have end pieces 10, are stitched or secured in position with staples as indicated. The bottom closure flaps 7 are then folded over as indicated in Figure 12, and preferably a reinforcing blank 11 is inserted to fit frictionally within the bottom, and if desirable, the bottom closing flaps and the reinforcing blank may be stitched together as with stitches such as are indicated at 12 in Figure 12.

Figure 4:
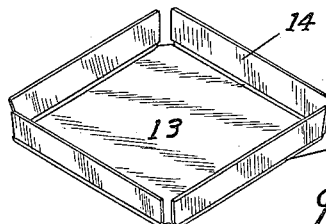
Figure 4 is a perspective view of the blank shown in Figure 2 folded and ready for insertion within the container.
Figure 6:
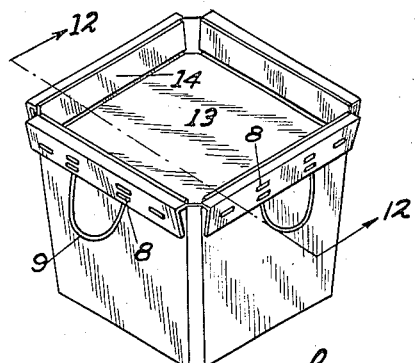
Figure 6 is a perspective view of a container after the insertion of the lower part of the display compartment.

The preferred type of lid is composed of a removable display compartment formed by a bottom portion which may be made in the form of a blank 13 having reinforcing flaps 14 secured thereto with areas of articulation such as are indicated at 15. After filling the container with the fruit or vegetables to be packed, the reinforcing flaps 14 are folded into the position indicated in Figure 4. These bottom compartment pieces may be previously folded, or downward pressure on the main body of the piece during the insertion thereof into position within the container will fold up the flaps 14. The lid for the container and for the display compartment is formed similarly as the blank 13, and has a main body portion 16 with reinforcing flaps 17 secured thereto with areas of articulation 18.

Figure 5:
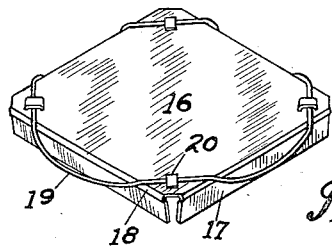
Figure 5 is a perspective view of the container lid which serves the double purpose of forming a lid for the display compartment and for reinforcing the lid of the container.
Figure 7:
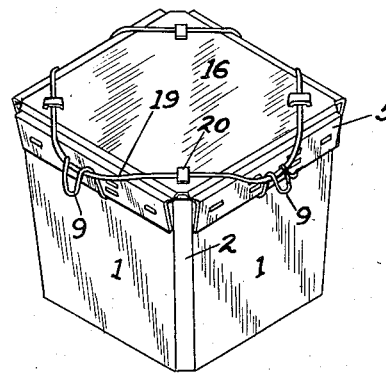
Figure 7 is a perspective view of the packed container ready for shipment.

In Figure 5 I have shown a preferred type of tieing device which consists of a wire 19 extended around the four corners of the container and secured to the lid with suitable wire stitching as indicated at 20. In securing the lid in position, the reinforcing flaps 17 are pressed down on the inner sides of the upwardly extending flaps 14 of the bottom piece of the compartment, and when the package is packed and ready for shipment, the extended loops of the wire 19 are fastened by bending the handles 9 over them as indicated in Figures 1 and 7.

In some instances it may be desirable to subdivide the container into compartments so that blanks such as are indicated at 21 in Figure 1, may be provided of such size as can be pushed down into the container to fit frictionally against the walls at a desired depth within the container.

Figure 2:
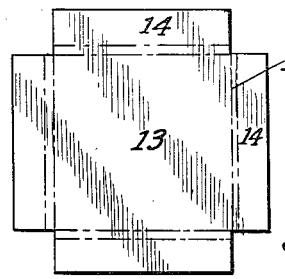
Figure 2 is a plan view of a blank from which a part of the preferred type of lid or display compartment is formed.
Figure 3:
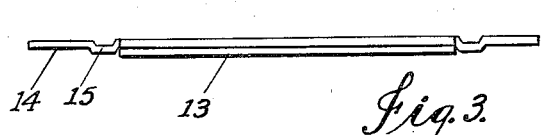
Figure 3 is a side elevation of the blank shown in Figure 2.
Figure 8:
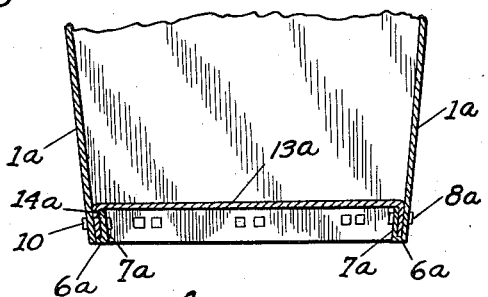
Figure 8 is a sectional view of the lower part of a container having a recessed bottom.

Instead of forming the bottom of the container with a reinforcing panel 11, it may be desirable to make a recessed bottom for the container, such as is indicated in Figure 8. In such modifications I prefer to form reinforcing flaps 7a articulated to the side walls 1a with a scored area indicated at 6a. The reinforcing flap 7a may first be folded up and secured with several stitches such as are indicated at 8a. A bottom piece of suitable size and form with a main body 13a and reinforcing flaps 14a, a construction similar in shape to that of the compartment bottom illustrated in Figures 2–4, may then be inserted with the flaps 14a wedged into the space between the flaps 7a and the side walls 1a. Suitable wire stitching may then be inserted, passing through the side walls 1a and the interlocking flaps to form a very rigid bottom.

In Figure 13 I have shown a modified type of top closure in which the top flaps 5a are folded inwardly with a filler piece 11a pressed into position, as indicated, firmly holding the flaps 5a against the side walls. A cover 16a is provided which fits over the side walls 1b and forms a display compartment similar to that formed in the other modifications. Strips of adhesive tape 19a may be employed to hold the cover in position.

In packing containers made in accordance with my invention, the container is set up, the top reinforcing flaps are folded over and stitched, and the bottom flaps folded in and secured in position. Fruit and vegetables are then packed to fill the container up to the line of the bottom of the display compartment lid. Compartment forming blanks, such as are shown at 21 in Figure 1, may be inserted during the packing, if desired. The compartment bottom 13 is then pressed into position within the container and the display fruit is packed in a layer within the compartment. The cover 16 is then pressed into position and the wires 19 are secured with the handles 9. The container is then ready for shipment, and it will be found a very satisfactory package in the amount of space which it occupies. Alternating rows may be staggered with the bottoms of the upper rows extending across the tops of two containers in the underneath rows. Very little bracing is required.

Upon arrival, the merchants handling the goods, by releasing the handles 9 and removing the covers, may display the display fruit or vegetables advantageously. If part of the contents is to be removed, the flaps 14 of the bottom of the compartment may be pulled upwardly and the contents removed from below in the main body of the container.

Having thus described my invention, what I claim as new and desire to secure by Letters Patent, is:—

1. A container for fruits or vegetables comprising a formed cut and scored blank having reinforcing flaps at the upper ends of the side walls folded over and attached to the side walls, a compartment lid for receiving display samples comprising a bottom having upwardly extending reinforcing flaps, pressing out against the side walls to hold the lid in position, and a cover for both the container and the compartment, and means for securing same to the container walls.

2. A container for fruits or vegetables comprising a formed cut and scored blank having reinforcing flaps at the upper ends of the side walls folded over and attached to the side walls, a compartment lid for receiving display samples comprising a bottom having upwardly extending reinforcing flaps, pressing out against the side walls to hold the lid in position, and a cover for both the container and the compartment, and means for securing same to the container walls in the reinforced portion thereof.

3. A container having an open top with a cover to fit within same composed of separable members which, when pressed within the opening in the top, form a display compartment, said cover comprising a bottom member having articulated reinforcing flaps folding upwardly at the sides, and a cover member having downwardly folding articulated flaps at the sides, the upwardly folding flaps of the bottom member fitting frictionally within the walls of the container and the downwardly folding flaps of the cover fitting frictionally within the upwardly folded flaps of the bottom member.

DAVID T. USHER.